A. C. LINDGREN.
MANURE SPREADER.
APPLICATION FILED JULY 15, 1910.

998,912.

Patented July 25, 1911.
2 SHEETS—SHEET 1.

Witnesses:
Francis S. Ober
James Atkins

Inventor
A. C. Lindgren
By his Attorney
P. T. Dodge

A. C. LINDGREN.
MANURE SPREADER.
APPLICATION FILED JULY 15, 1910.
998,912.
Patented July 25, 1911.
2 SHEETS—SHEET 2.
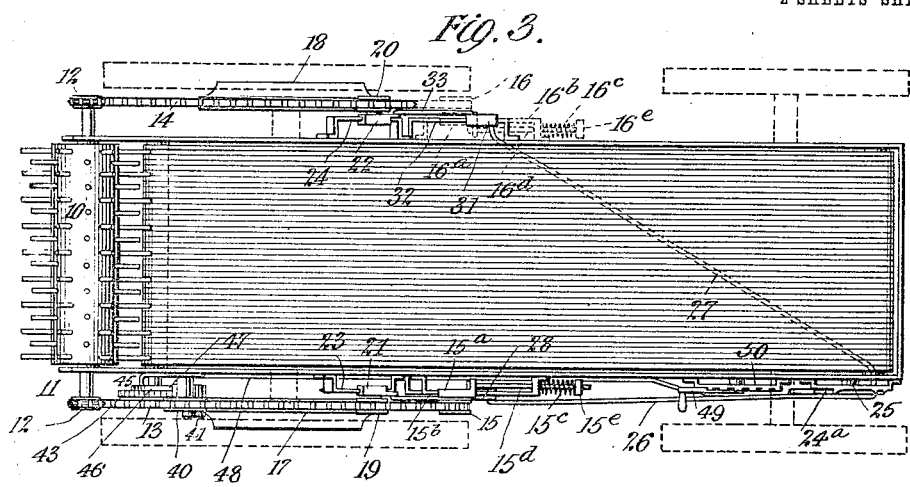
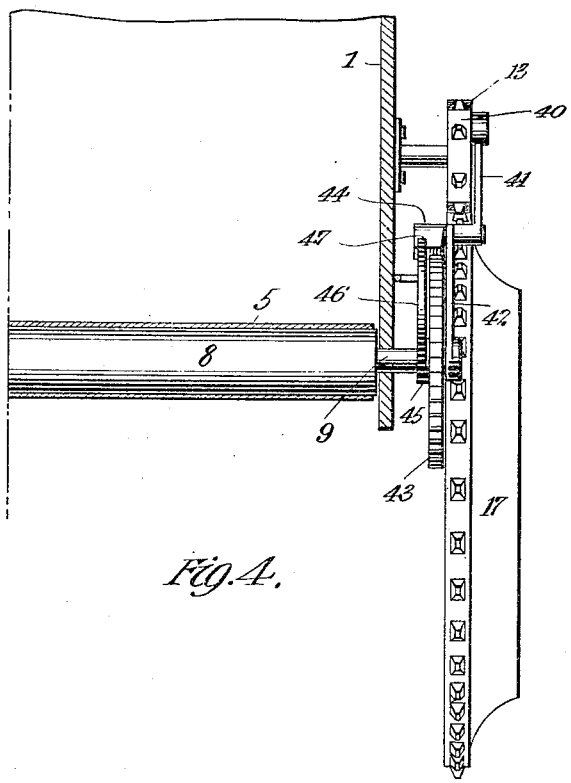

UNITED STATES PATENT OFFICE.

ALEXUS C. LINDGREN, OF MOLINE, ILLINOIS, ASSIGNOR TO MOLINE PLOW COMPANY, A CORPORATION OF ILLINOIS.

MANURE-SPREADER.

998,912.

Specification of Letters Patent.   Patented July 25, 1911.

Application filed July 15, 1910. Serial No. 572,176.

*To all whom it may concern:*

Be it known that I, ALEXUS C. LINDGREN, of Moline, county of Rock Island, and State of Illinois, have invented a new and useful Improvement in Manure - Spreaders, of which the following is a specification.

This invention relates to manure spreaders of the type embodying a rotary beater to distribute the manure, and a feeding apron which coöperates with the beater in feeding the manure to the action of the beater.

The objects of the invention are to produce a mechanism of this type in which the driving devices for the several parts will be simple in construction, effective in action, and which may be conveniently and easily controlled by the driver.

With these ends in view, my invention consists in a driving mechanism for the beater and feeding apron, said mechanism comprising endless driving chains arranged on opposite sides of the body of the machine and adapted to be driven by sprocket wheels on the ground wheels, the said chains being arranged to drive sprockets on the beater mechanism shaft, and adapted also to drive a sprocket controlling the action of the feeding apron, suitable means of improved form and construction being provided, under the control of the driver, for disengaging the driving chains from their driving sprockets or engaging the same at will; whereby the beater and feeding apron may be thrown into or out of action as desired.

The invention consists also in the details of construction and combination of parts hereinafter described and claimed.

Figure 1:
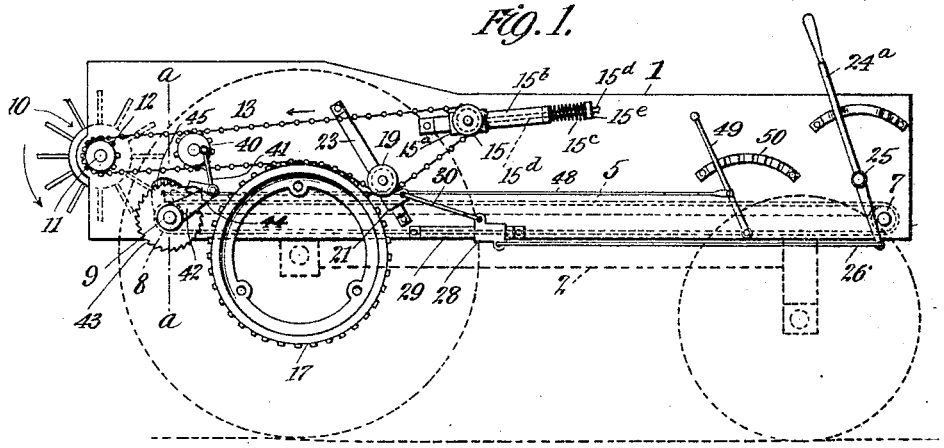
Figure 2:
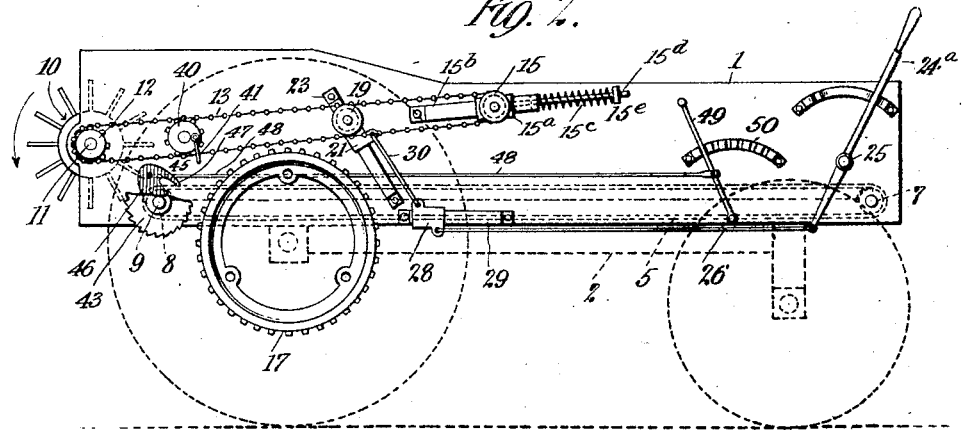

In the accompanying drawings: Figure 1 is a side elevation of my improved machine, showing the driving chain engaged with its driving sprocket in order to operate the beater and feeding apron. Fig. 2 is a similar view showing the driving chain disengaged from its sprocket. Fig. 3 is a top plan view of the machine. Fig. 4 is a transverse sectional elevation on the line *a—a* of Fig. 1.

Referring to the drawings: 1 represents a box or body to receive the manure, and which is sustained and supported by a wagon gear 2 having the usual front and rear wheels.

Within the body, at its bottom, is arranged a feeding apron 5 adapted, as usual, to feed the manure rearwardly and present the same continuously to the action of the beater mechanism. This feeding device may be of any suitable or appropriate form. In the present instance, it consists of an endless apron passing over supporting rolls 7 and 8 at the front and rear of the body respectively, the roll 8 being carried by a driving shaft 9 journaled in suitable bearings, and adapted to receive a step-by-step motion in the manner presently to be described.

The beater 10 is mounted at the rear end of the body, on a shaft 11 journaled in suitable bearings, which shaft has fixed to its opposite ends sprocket wheels 12.

13 and 14 represent endless driving chains arranged on opposite sides of the box and passing at the rear over the said sprocket wheels 12, and at the front over tension devices in the form of guide sheaves 15 and 16, the said chains between their ends being adapted to engage and be driven by driving sprocket wheels 17 and 18 fixed to the rear ground wheels, whereby the motion of the ground wheels will be imparted to the beater shaft, and will rotate the beater in the direction of the arrow in Fig. 1.

The sheaves 15 and 16 are carried by blocks 15ª and 16ª mounted to slide back and forth on guide rails 15ᵇ and 16ᵇ fixed to the sides of the body, which blocks are urged constantly forward by means of springs 15ᶜ and 16ᶜ, encircling rods 15ᵈ and 16ᵈ connected with the sliding blocks and extending through the ends of the guide rails, the said springs bearing at their forward ends against heads 15ᵉ and 16ᵉ on the rods, and at their rear ends against the ends of the rails, and tending to draw the sheaves forward and thereby maintain the driving chains under tension and free of the driving sprockets, as shown in Fig. 2. The chains are connected with the driving sprockets and held in engagement, by means of movable devices in the form of pulleys 19 and 20 arranged to engage the lower side of the chains, and journaled respectively on movable frames 21 and 22 mounted to slide on guide plates 23 and 24 fixed to the sides of the body, the movement of said slides downwardly causing the lower side of the chains to be drawn down and engaged with the driving sprockets, against the influence of the springs 15ᶜ and 16ᶜ; and the movements of said slides upwardly, permitting the chains to be drawn by the springs free of the said sprockets, as shown in Fig. 2, these actions causing the beater mechanism to be thrown into and out of gear respectively. The movements of the slides 21 and 22 are effected by means of a hand lever 24ᵃ at the front end of the body, which hand lever is pivoted to the side of the body as at 25, and has jointed to its lower end a rod 26 extending longitudinally rearwardly, and a rod 27 extending rearwardly and obliquely to the opposite side of the body. The rear end of rod 26 is jointed to a sliding block 28 mounted to move back and forth on a guiding plate 29, which block is jointed, by means of a link 30, to the slide 21 carrying the pulley 19. The rear end of rod 27 is jointed to a sliding block 31 mounted to move back and forth on a guide plate 32, which block is jointed, by means of a link 33, with the sliding block 22 carrying pulley 20. By this construction, when the lever 24 is thrown to the rear, as in Fig. 1, the pulleys 19 and 20 will be drawn downwardly and will force the lower sides of the endless sprocket chains into engagement respectively with the driving sprocket wheels, the tension sheaves 15 and 16 being drawn rearwardly against the influence of their springs. When the lever 24 is thrown forwardly, as in Fig. 2, the pulleys 19 and 20 will be moved upwardly, and releasing the chains, the tension sheaves will act to draw the lower sides of the chains upwardly and free of the driving sprockets.

The feeding apron, before alluded to, receives its motion from one of the endless driving chains through the medium of a sprocket wheel 40 journaled on the side of the body and arranged within the endless chain, being engaged at its upper and lower sides by the upper and lower portions of the chain respectively, by which means the motion of the chain will be imparted to the sprocket in the direction of the arrow in Fig. 1. Pivoted eccentrically to the sprocket, is a link 41, whose lower end is jointed to the outer end of a vibratory arm 42, the inner end of which is mounted loosely on the shaft 9, before alluded to. Adjacent this arm, the shaft has fixed to it a ratchet wheel 43, whose teeth are adapted to be engaged by a driving dog 44 on the end of the arm 42, whereby the vibratory motion of said arm, effected by the rotation of the sprocket wheel 40, will advance the shaft 9 intermittently step-by-step and thereby impart a corresponding motion to the feeding apron.

In order that the extent of movement of the shaft 9 by each vibration of the arm may be varied, in order to vary the speed of advance of the feeding apron, I provide a device 45 adapted to coöperate with the driving dog 44 in such manner as to control the engagement of said dog with the ratchet teeth, the adjustment of the said device in one position permitting the driving dog to remain in engagement with a tooth during the full stroke of the dog, and its adjustment in a different position permitting the dog to remain in engagement with a tooth for only a portion of the stroke of the dog. This device consists of an arm 46 mounted at its inner end loosely on the shaft 9 adjacent the ratchet wheel, and having its outer end formed with a curved cam surface 47. The arm is adapted to be adjusted relatively to the driving dog by means of a rod 48 jointed at its rear end thereto and extending forwardly alongside of the body and jointed at its forward end to an adjusting lever 49 pivoted at its lower end to the body and adapted to be engaged in notches in a locking plate 50 fixed to the body. By means of this construction, the cam surface 47 on the arm 46 may be set in different positions relatively to the driving dog, which latter is of such width that it will extend over said cam surface. When it is desired that the driving dog maintain engagement with the sprocket tooth for the full stroke of the dog, and thereby give to the apron its maximum feed, the cam surface 47 is adjusted free of engagement with the dog. When, however, it is desired that the dog remain in engagement with the tooth only for a portion of the stroke of the dog, the cam surface is adjusted so that the dog will engage therewith in its feeding motion, with the result that the dog will be held out of engagement with the ratchet tooth during a portion of its stroke, according to the adjustment of the cam surface. By this means, the speed of the apron may be nicely controlled, according to the conditions encountered in practice.

It will be observed from the construction described that all of the operative parts of the mechanism, are sustained and carried by the body or box, which may be applied to an ordinary wagon gear as an attachment, with the addition only of sprocket wheels to the ground wheels of the gear. Further, it will be observed that the mechanism is composed of few parts, is effective in operation, and by means of the movable sheaves 19 and 20, the parts may be instantly thrown into or out of operation, as desired, by the single hand lever 24.

While in the accompanying drawings I have illustrated an embodiment of my invention which in practice has been found to answer to a satisfactory extent the results to be attained, it is to be understood that the details may be variously modified by the skilled mechanic without departing from the limits of my invention, and it is further to be understood that the invention is not to be limited to any particular form or construction of the parts except in so far as such limitations are specified in the claims.

Having thus described my invention, what I claim is:—

1. In a manure spreader, the combination with a driving sprocket, of an endless chain, a rotary beater mechanism provided with a sprocket wheel engaged by said chain, a tension device also engaged by the chain for holding the same normally out of engagement with the driving sprocket, and a movable device adapted to engage the chain between the beater sprocket and tension device, and acting by its movements to control the engagement of the chain with and its disengagement from the driving sprocket.

2. In a manure spreader, the combination with a driving sprocket, of an endless chain, a rotary beater mechanism adapted to be operated by said sprocket chain, a spring actuated tension device engaged by the chain and tending to hold the same disengaged from the driving sprocket, and a movable device engaging the chain and adapted when moved, to force the same against the action of the tension device into engagement with the driving sprocket.

3. In a manure spreader, the combination with a driving sprocket, of an endless chain arranged above the same, a beater mechanism operated by said chain, a tension device acting on the chain and tending normally to hold the same above the driving sprocket and out of engagement therewith, and a downwardly moving device engaging the lower part of the chain and adapted to force the chain downwardly against the action of the tension device and into engagement with the driving sprocket.

4. In a manure spreader, the combination with a driving sprocket, of an endless driving chain, a beater mechanism operated by said chain, an intermittently acting apron feeding mechanism to advance the apron step by step, and an idler sprocket wheel independent of the beater mechanism engaged on opposite sides by the chain and operatively connected with the intermittently acting apron feeding mechanism.

5. In a manure spreader, the combination with a driving sprocket, of an endless driving chain, a beater mechanism provided with a sprocket wheel engaged by said chain, a tension device also engaged by the chain, a sprocket wheel between the beater mechanism and tension device engaged on opposite sides by the chain, and mechanism controlled by the rotation of the last named sprocket for advancing the apron step by step.

6. In a manure spreader, the combination with a driving sprocket, of an endless driving chain, a beater mechanism operated thereby, an apron feeding shaft, a vibratory arm adapted to operate the said shaft intermittently, an idler sprocket wheel independent of the beater mechanism engaged by said chain, and a link pivoted eccentrically to said sprocket wheel and to the vibratory arm.

In testimony whereof I hereunto set my hand this 13th day of July, 1910, in the presence of two attesting witnesses.

ALEXUS C. LINDGREN.

Witnesses:
L. C. BLANDING,
C. M. BANSKE.